US007992539B2

(12) United States Patent
Ikoma

(10) Patent No.: US 7,992,539 B2
(45) Date of Patent: Aug. 9, 2011

(54) FUEL INJECTION CONTROL DEVICE OF AN INTERNAL COMBUSTION ENGINE

(75) Inventor: Takuya Ikoma, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 95 days.

(21) Appl. No.: 12/443,698

(22) PCT Filed: Oct. 5, 2007

(86) PCT No.: PCT/JP2007/070033

§ 371 (c)(1),
(2), (4) Date: Mar. 31, 2009

(87) PCT Pub. No.: WO2008/044789

PCT Pub. Date: Apr. 17, 2008

(65) Prior Publication Data

US 2010/0030449 A1 Feb. 4, 2010

(30) Foreign Application Priority Data

Oct. 6, 2006 (JP) ................................ 2006-275133

(51) Int. Cl.

| | |
|---|---|
| ***F02B 3/00*** | (2006.01) |
| ***F02B 7/00*** | (2006.01) |
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl. ......................... 123/299; 123/431; 701/103

(58) Field of Classification Search .................. 701/103, 701/104; 123/431, 299, 300, 575, 576, 577, 123/578

See application file for complete search history.

(56) References Cited

U.S. PATENT DOCUMENTS

| | | | | |
|---|---|---|---|---|
| 5,875,743 | A * | 3/1999 | Dickey | 123/25 C |
| 6,928,983 | B2 * | 8/2005 | Mashiki | 123/431 |
| 7,856,966 | B2 * | 12/2010 | Saitoh | 123/575 |
| 2002/0120171 | A1 * | 8/2002 | Avery et al. | 585/14 |
| 2005/0166896 | A1 * | 8/2005 | Sadakane et al. | 123/431 |
| 2005/0178360 | A1 * | 8/2005 | Satou | 123/431 |
| 2005/0274353 | A1 * | 12/2005 | Okubo et al. | 123/299 |
| 2007/0119392 | A1 * | 5/2007 | Leone et al. | 123/25 C |
| 2009/0090332 | A1 * | 4/2009 | Brehob | 123/464 |

FOREIGN PATENT DOCUMENTS

| | | |
|---|---|---|
| JP | 2003 227375 | 8/2003 |
| JP | 2005 120852 | 5/2005 |
| JP | 2005 201083 | 7/2005 |
| JP | 2006 37913 | 2/2006 |

* cited by examiner

*Primary Examiner* — Erick Solis
*Assistant Examiner* — Sizo B Vilakazi
(74) *Attorney, Agent, or Firm* — Oblon, Spivak, McClelland, Maier & Neustadt, L.L.P.

(57) ABSTRACT

An ECU executes a program including injecting fuel only by an intake passage injector when an engine is idling, starting an addition-type PFI timer, resetting the PFI timer when a count of the PFI timer reaches a set value that is set shorter as the fuel is lighter in fuel property, and injecting the fuel only by an in-cylinder injector.

12 Claims, 10 Drawing Sheets

FUEL INJECTION CONTROL DEVICE OF AN INTERNAL COMBUSTION ENGINE

TECHNICAL FIELD

The invention relates to an internal combustion engine including a first fuel injection mechanism (in-cylinder injector) injecting fuel into a cylinder and a second fuel injection mechanism (intake passage injector) injecting the fuel into an intake passage or an intake port, and particularly to a technique avoiding production of deposits in a nozzle of the first fuel injection mechanism while avoiding a problem that may occur due to the first fuel injection mechanism during idling.

BACKGROUND ART

There has been an internal combustion engine that includes an intake passage injector for injecting fuel into an intake passage of an internal combustion engine and an in-cylinder injector for injecting the fuel into a combustion chamber of the internal combustion engine, and determines a fuel injection ratio between the intake passage injector and the in-cylinder injector based on a revolution speed of the internal combustion engine and a load of the internal combustion engine.

The in-cylinder injector is exposed to a hot combustion gas in a combustion chamber so that deposits are liable to adhere onto a nozzle unit of the in-cylinder injector. Further, when the fuel is injected only from the intake passage injector, the in-cylinder injector does not inject the fuel so that cooling by vaporization of the fuel does not occur, and the temperature of the nozzle unit rises, resulting in further production of the deposits on the nozzle unit. These deposits interfere with the fuel injection from the nozzle unit, and change a form of a fuel spray to increase a particle diameter. Also, a quantity of the injected fuel becomes smaller than a required quantity, which may cause misfire and thus a combustion failure.

Japanese Patent Laying-Open No. 2005-201083 has disclosed an injection control device of an internal combustion engine that can appropriately suppress production of deposits on a nozzle unit of an in-cylinder injector. This injection control device of the internal combustion engine includes an in-cylinder injector injecting fuel into a cylinder of the internal combustion engine, an intake passage injector injecting the fuel into an intake passage and a control unit that controls driving of at least one of these injectors to change a form of the fuel injection. The control unit forcedly changes the fuel injection form to inject the fuel only by the in-cylinder injector for a predetermined period when the engine is in a drive region where the intake passage injector injects the fuel.

Since this fuel injection control device of the internal combustion engine is configured to perform the fuel injection only by the in-cylinder injector for the predetermined period even when the engine is in the region where the fuel injection is to be performed only by the intake passage injector, an injection force can blow off deposits produced on the nozzle unit of the in-cylinder injector and thus can remove the deposits. Further, the above fuel injection by the in-cylinder injector can cool the nozzle unit by vaporization of the fuel, and thereby can suppress the production of new deposits on the nozzle. Consequently, it is possible to suppress lowering of the fuel injection quantity of the in-cylinder injector.

Variations within an allowed range are present in the properties (including a state) of the fuel used in the internal combustion engine. For example, the fuel properties may be classified as being light or being heavy. When the fuel contains a large amount of olefin (unsaturated hydrocarbon with at least one carbon-carbon double bond) ingredient, the fuel is light in property. When the fuel contains a small amount of olefin ingredient, the fuel is heavy in property. When the fuel contains a large amount of olefin ingredient, there is a tendency to produce rapidly the deposits. However, Japanese Patent Laying-Open No. 2005-201083 described above has not referred to this difference in fuel property.

DISCLOSURE OF THE INVENTION

The invention has been made for overcoming the above problem, and an object of the invention is to provide a fuel injection control device of an internal combustion engine that has a first fuel injection mechanism injecting fuel into a cylinder and a second fuel injection mechanism injecting the fuel into an intake passage or an intake port, and particularly to provide the fuel injection control device that can appropriately avoid production of deposits in a nozzle of the first fuel injection mechanism even when there are variations in fuel property.

A fuel injection control device of an internal combustion engine according to the invention controls the internal combustion engine provided with a first fuel injection mechanism injecting fuel into a cylinder and a second fuel injection mechanism injecting the fuel into an intake passage. This fuel injection control device includes a setting unit setting conditions about avoiding of the fuel injection only by the second fuel injection mechanism, corresponding an ingredient of the fuel related to a degree of production of in-cylinder deposits in the first fuel injection mechanism; an injection control unit controlling the two kinds of fuel injection mechanisms to share the fuel injection between the first and second fuel injection mechanisms; and a control unit controlling the two kinds of fuel injection mechanisms such that the first fuel injection mechanism injects the fuel when the conditions are satisfied while only the second fuel injection mechanism is injecting the fuel.

According to the invention, in a state of a low revolution speed and a low load, only the second fuel injection mechanism often injects the fuel for ensuring combustion stability and taking measures against noises and vibrations of a high-pressure system. In this operation, the first fuel injection mechanism does not inject the fuel, and the nozzle of the first fuel injection mechanism is exposed in the hot combustion chamber so that deposits are liable to be produced in the nozzle. The properties of the fuel affect the degree of producibility of deposits. Therefore, the conditions for avoiding the fuel injection only by the first fuel injection mechanism are set according to the ingredients of the fuel that relate to the degree of production of the in-cylinder deposits on the first fuel injection mechanism. For example, when the fuel ingredients have the properties that easily promote the production of deposits, the above conditions are set to allow easy meeting thereof. When the fuel ingredients have the properties that hardly promote the production of deposits, the above conditions are set to suppress the meeting thereof. Therefore, when only the second fuel injection mechanism is injecting the fuel during the low-speed and low-load state, and the ingredients of the fuel have the properties that easily promote the production of deposits, the conditions can be easily met so that the first fuel injection mechanism can early inject the fuel to avoid the production of deposits. Consequently, the invention can provide the fuel injection control device of the internal combustion engine that includes the first fuel injection mechanism injecting the fuel into the cylinder and the second fuel injection mechanism injecting the fuel into the intake passage or intake port, and particularly can provide the fuel injection control device that can appropriately avoid the production of deposits in the nozzle of the first fuel injection mechanism even when variations are present in fuel property.

Preferably, the control unit controls the two kinds of fuel injection mechanisms according to the state of the fuel injection only by the second fuel injection mechanism such that the fuel injection returns from the fuel injection by the first fuel injection mechanism to the fuel injection only by the second fuel injection mechanism.

According to the invention, the fuel injection only by the second fuel injection mechanism resumes after the length of time of fuel injection by the first fuel injection mechanism is increased or the number of times of the injection by the first fuel injection mechanism is increased according to the state of the fuel injection only by the second fuel injection mechanism and, for example, as the injection only by the second fuel injection mechanism was performed for a longer time or was performed more times. Further, the fuel injection only by the second fuel injection mechanism resumes after the length of time of fuel injection by the first fuel injection mechanism is reduced or the number of times of the injection by the first fuel injection mechanism is reduced as the injection only by the second fuel injection mechanism was performed for a shorter time or was performed fewer times. Therefore, it is possible to ensure stability in combustion performed only by the second fuel injection mechanism during a low-speed and low-load driving as well as to take measures against noises and vibrations of a high-pressure system while avoiding production of deposits on the first fuel injection mechanism.

Further preferably, the control unit controls the two kinds of fuel injection mechanisms when the internal combustion engine is idling.

This invention can avoid the production of deposits in the nozzle of the first fuel injection mechanism during an idling operation in a low-speed and low-load region while ensuring the combustion stability and taking measures against noises and vibrations.

Further preferably, an ingredient of the fuel relates to a content of olefin.

According to the invention, when an olefin content is high (i.e., it is so-called light in fuel property), this easily promotes the production of deposits. When the olefin content is low (i.e., it is heavy in fuel property), this hardly promotes the production of deposits. Therefore, the fuel injection can be switched from the injection only by the second fuel injection mechanism to that only by the first fuel injection mechanism, e.g., according to the state of rising of the revolution speed during starting of the internal combustion engine (because the fuel is light when the revolution speed rises rapidly, and the fuel is heavy when the revolution speed rises slowly). Consequently, even when there are variations in fuel property, the deposits on the first fuel injection mechanism can be appropriately avoided.

BEST MODES FOR CARRYING OUT THE INVENTION

Embodiments of the invention will now be described with reference to the drawings. In the following description, the same portions bear the same reference numbers and the same names, and achieve the same functions. Therefore, description thereof is not repeated.

Figure 1:
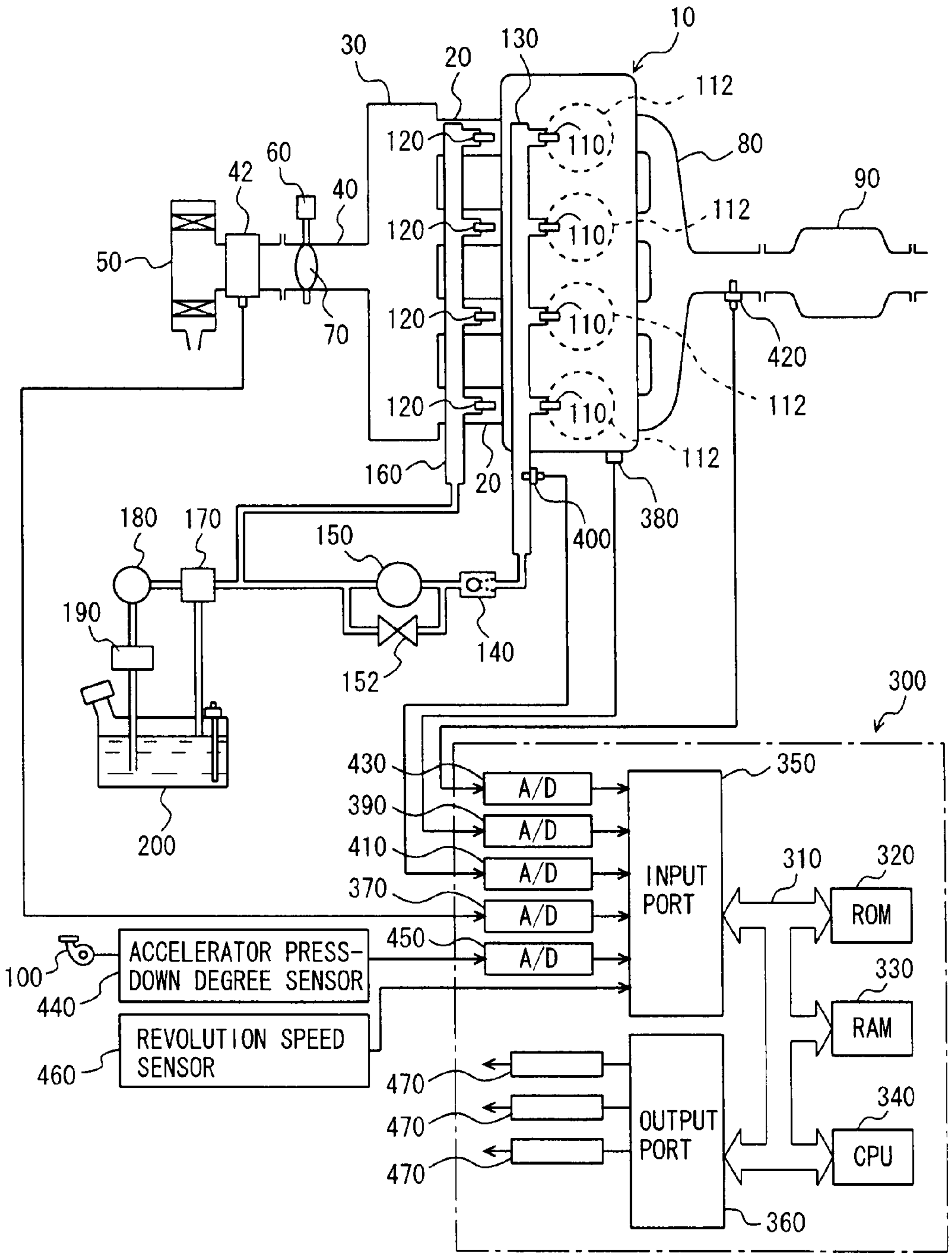
FIG. 1 schematically shows a structure of an engine system controlled by a control device according to the embodiment of the invention.

FIG. 1 schematically shows a structure of an engine system controlled by an engine ECU (Electronic Control Unit) that is a fuel injection control device of an internal combustion engine according to the embodiment of the invention. Although an engine shown in FIG. 1 is an in-line 4-cylinder gasoline engine, the invention is not restricted to this type of engine.

As shown in FIG. 1, an engine 10 includes four cylinders 112, which are connected to a common surge tank 30 via corresponding intake manifolds 20, respectively. Surge tank 30 is connected to an air cleaner 50 via an intake duct 40, in which an air flow meter 42 as well as a throttle valve 70 driven by an electric motor 60 are arranged. An opening position of throttle valve 70 is controlled based on an output signal of engine ECU 300 and is controlled independently of an accelerator pedal 100. All cylinders 112 are coupled to a common exhaust manifold 80, which is coupled to a three-way catalytic converter 90.

For each cylinder 112, there are arranged an in-cylinder injector 110 for injecting fuel into the cylinder and an intake passage injector 120 for injecting the fuel into an intake port and/or an intake passage. These injectors 110 and 120 are controlled based on the output signals of engine ECU 300. All in-cylinder injectors 110 are connected to a common fuel delivery pipe 130, which is connected to an engine-driven high-pressure fuel pump 150 via a check valve 140 allowing delivery toward fuel delivery pipe 130. Although the embodiment will be described in connection with the internal combustion engine provided with two kinds of injectors that are independent of each other. However, the invention is not restricted to the internal combustion engine having such structures. For example, the internal combustion engine may have a single injector having both the in-cylinder injection function and the intake passage injection function (although the single injector has two nozzles, i.e., a nozzle for injecting the fuel into the cylinder and a nozzle for injecting the fuel into the intake port and/or intake passage).

As shown in FIG. 1, a discharge side of high-pressure fuel pump 150 is coupled to an intake side of high-pressure fuel pump 150 via an electromagnetic spill valve 152. As the degree of opening of electromagnetic spill valve 152 decreases, the quantity of fuel supplied from high-pressure fuel pump 150 to fuel delivery pipe 130 increases. When electromagnetic spill valve 152 fully opens, the fuel supply from high-pressure fuel pump 150 to fuel delivery pipe 130 stops. Electromagnetic spill valve 152 is controlled by the output signal of engine ECU 300.

More specifically, in high-pressure fuel pump 150 that pressurizes the fuel by a pump plunger vertically moved by a cam arranged on a cam shaft, electromagnetic spill valve 152 arranged on the pump intake side is closed in a pressurizing stroke according to timing that is determined by feedback control of engine ECU 300, using a fuel pressure sensor 400 arranged in fuel delivery pipe 130. Thereby, the fuel pressure in fuel delivery pipe 130 is controlled. Thus, engine ECU 300 controls electromagnetic spill valve 152, and thereby controls the quantity and pressure of the fuel supplied from high-pressure fuel pump 150 to fuel delivery pipe 130.

All intake passage injectors 120 are connected to a common fuel delivery pipe 160 on a low pressure side, and fuel delivery pipe 160 and high-pressure fuel pump 150 are connected via a common fuel pressure regulator 170 to a low-pressure fuel pump 180 driven by an electric motor. Further, low-pressure fuel pump 180 is connected via a fuel filter 190 to a fuel tank 200. Fuel pressure regulator 170 is configured to return a part of the fuel discharged from low-pressure fuel pump 180 to fuel tank 200 when a fuel pressure of the fuel discharged from low-pressure fuel pump 180 is higher than a set fuel pressure that is predetermined, and therefore prevents such a situation that the fuel pressure supplied to intake passage injector 120 and the fuel pressure supplied to high-pressure fuel pump 150 exceed the foregoing set fuel pressure.

Engine ECU 300 is formed of a digital computer, and includes an ROM (Read Only Memory) 320, RAM (Random Access Memory) 330, CPU (Central Processing Unit) 340, input port 350 and output port 360 which are mutually connected via a bidirectional bus 310.

Air flow meter 42 generates an output voltage proportional to an intake air quantity, and provides this output voltage to input port 350 via an A/D converter 370. A water temperature sensor 380 that generates an output voltage proportional to a temperature of an engine cooling water is attached to engine 10, and provides the above output voltage to input port 350 via an A/D converter 390.

Fuel pressure sensor 400 that generates an output voltage proportional to the fuel pressure in fuel delivery pipe 130 is attached to fuel delivery pipe 130, and provides the above output voltage to input port 350 via an A/D converter 410. An air-fuel ratio sensor 420 that generates an output voltage proportional to a concentration of oxygen in an exhaust gas is attached to exhaust manifold 80 located upstream to three-way catalytic converter 90, and provides the above output voltage to input port 350 via an A/D converter 430.

Air-fuel ratio sensor 420 in the engine system according to the embodiment is an all-range air-fuel sensor (linear air-fuel sensor) that generates an output voltage proportional to the air-fuel ratio of an air-fuel mixture burned in engine 10. Air-fuel ratio sensor 420 may be an $O_2$ sensor that senses in an on-off fashion whether the air-fuel ratio of the air-fuel mixture burned in engine 10 is rich or lean with respect to a theoretical air-fuel ratio.

Accelerator pedal 100 is connected to an accelerator press-down degree sensor 440 that generates an output voltage proportional to a press-down amount of accelerator pedal 100, and provides the above output voltage to an input port 350 via an A/D converter 450. Further, input port 350 is further connected to a revolution speed sensor 460 generating an output pulse representing an engine revolution speed. ROM 320 of engine ECU 300 has stored, in a map form, values of fuel injection quantity that are set corresponding to a drive state based on an engine load factor and the engine revolution speed obtained from foregoing accelerator press-down degree sensor 440 and revolution speed sensor 460, and has also stored values such as correction values based on the temperature of the engine cooling water in the map form.

Figure 2:
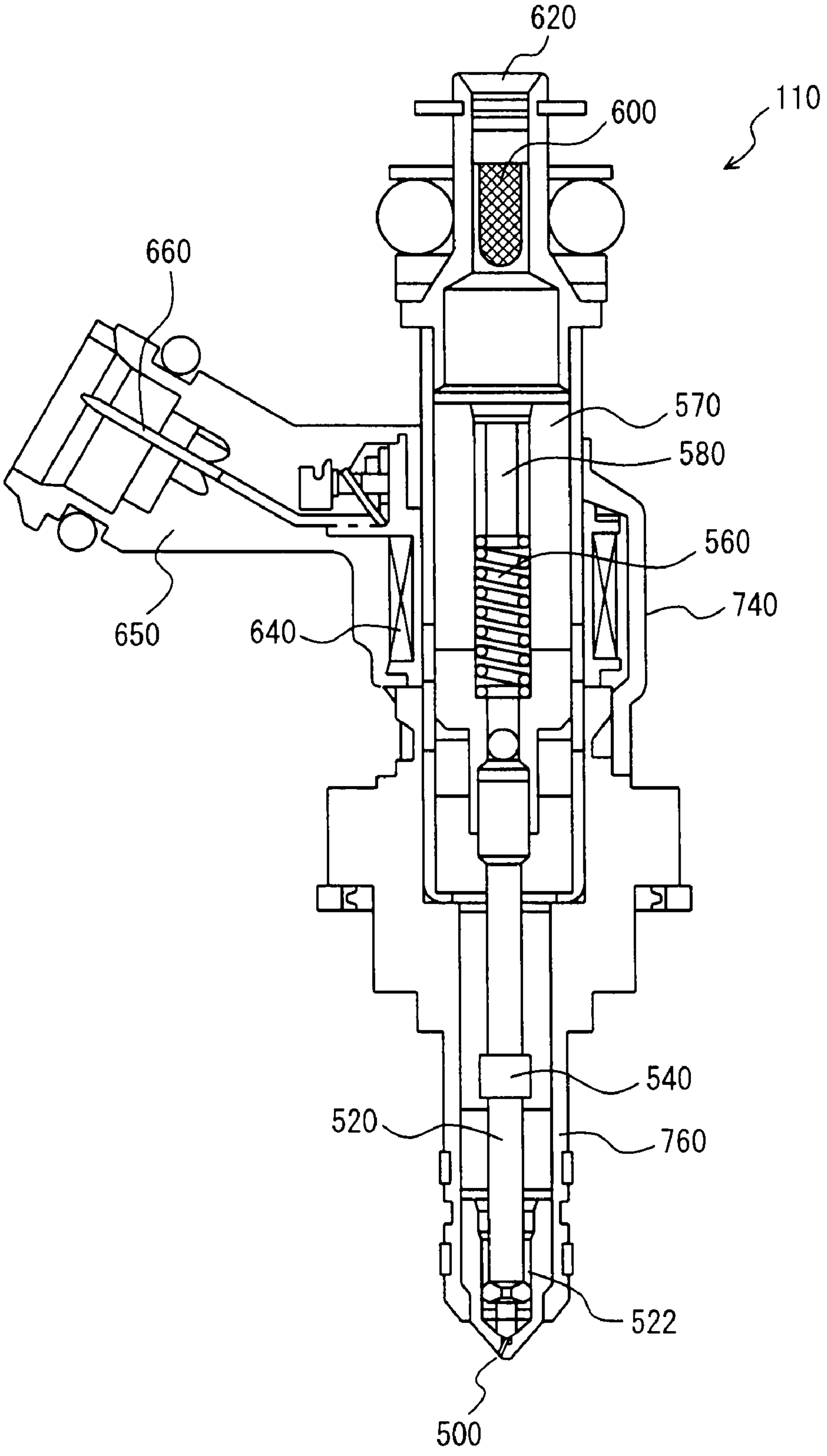
FIG. 2 is a cross section of an in-cylinder injector.

Referring to FIG. 2, in-cylinder injector 110 will be described below. FIG. 2 is a cross section of in-cylinder injector 110 taken in its longitudinal direction.

As shown in FIG. 2, in-cylinder injector 110 has a main body 740 and a nozzle body 760 fixed to a lower end of main body 740 by a nozzle holder with a spacer therebetween. Nozzle body 760 is provided at its lower end with a nozzle 500, and a needle 520 is arranged vertically movably in nozzle body 760. An upper end of needle 520 is in contact with a core 540 that is slidable in main body 740. A spring 560 biases needle 520 downward via core 540, and needle 520 is seated onto an inner peripheral seat surface 522 of nozzle body 760 to close nozzle 500 in a normal state.

A sleeve 570 is fixedly fitted into an upper end of main body 740, and a fuel passage 580 is formed inside sleeve 570. A lower end of fuel passage 580 is in communication with an inside of nozzle body 760 via a passage in main body 740, and nozzle 500 injects the fuel when needle 520 is lifted. An upper end of fuel passage 580 is connected via a filter 600 to a fuel inlet 620, which is connected to fuel delivery pipe 130 shown in FIG. 1.

An electromagnetic solenoid 640 is arranged inside main body 740 and surrounds a lower end portion of sleeve 570. When solenoid 640 is electrified, core 540 rises against spring 560, and the fuel pressure pushes up needle 520 to open nozzle 500 so that the fuel injection is executed. Solenoid 640 is led to a wire 660 in an insulating housing 650, and can receive an electric signal for opening the valve from engine ECU 300. When engine ECU 300 does not output the electric signal for opening the valve, in-cylinder injector 110 does not inject the fuel.

The electric signal provided from engine ECU 300 for opening the valve controls fuel injection timing and a fuel injection period of in-cylinder injector 110. By controlling this fuel injection period, the fuel injection quantity of in-cylinder injector 110 can be adjusted. More specifically, this electric signal can control in-cylinder injector 110 to inject a minimum quantity of fuel (in a region of the minimum fuel injection quantity of more). For the above control, an EDU (Electronic Driver Unit) may be arranged between engine ECU 300 and in-cylinder injector 110.

The fuel is supplied from in-cylinder injector 110 of the above structure has a very high pressure of about 13 MPa so that large noises and vibrations may occur at the times of valve opening and valve closing. A driver of the vehicle equipped with engine 10 cannot sense such noises and vibrations when engine 10 is operating in a region of a large load and a high revolution speed. However, when engine 10 is operating in a region of a small load and a low revolution speed, the driver senses such noises and vibrations. Accordingly, engine ECU 300 that is the control device of the internal combustion engine according to the embodiment executes the control for lowering the pressure of the fuel supplied to in-cylinder injector 110 during the low load operation. Further, when the fuel pressure is low as described above, engine ECU 300 controls engine 10 to offer the required output performance by injecting the fuel from intake passage injector 120 so as to prevent a shortage of the fuel that may occur due to the fuel supply only from in-cylinder injector 110.

Figure 3:
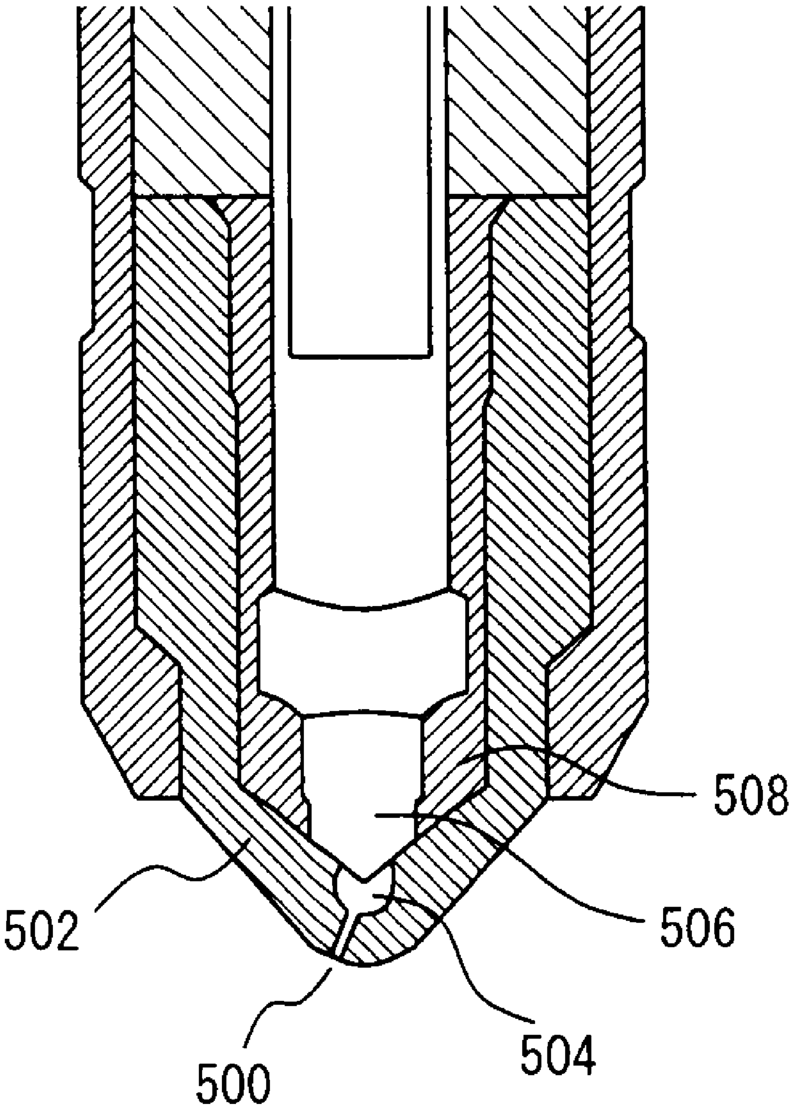
FIG. 3 is a cross section of a tip of the in-cylinder injector.

FIG. 3 is a cross section of a tip of in-cylinder injector 110. The tip of in-cylinder injector 110 is formed of a valve body 502 provided with nozzle 500, a suction volume 504 forming a fuel reservoir, a needle tip 506 and a fuel retention unit 508.

After the fuel supplied from in-cylinder injector 110 was injected through the intake stroke and compression stroke, a part of the fuel pushed out from fuel retention unit 508 by needle tip 506 probably remains in suction volume 504 without being injected from nozzle 500 to the outside of in-cylinder injector 110. Further, the fuel will probably leak into suction volume 504 through an oil-tight seal unit when in-cylinder injector 110 continues it stopped state.

When the air-fuel mixture ignites in the combustion chamber and a flame expands across the tip of in-cylinder injector 110, a reversible reaction of ($2NO \leftrightarrows N_2+O_2$) occurs in the cylinder where a hot combustion-product gas contains $NO_x$. In this situation, the following first and second states occur.

In the first state, $O_2$ on the right side reacts with a part of the fuel in the suction volume 504 when the flame expands across the tip so that the temperature rises.

In the second state, however, a majority of the above fuel does not burn due to a lack of oxygen, and will remain as carbon under the above temperature conditions to clog gradually nozzle 500.

The temperature of the tip of in-cylinder injector 110 is affected by the heat received from the combustion gas. As the temperature rises, the state in which the carbon appears to clog gradually nozzle 500 (second state) probably becomes more remarkable, although there are other factors such as heat reception from a head and heat release to the fuel. Further, It can be considered from the first state that the temperature rising in suction volume 504 and the concentration of the $NO_x$ are related with the production of deposits.

Therefore, the carbon content of the fuel, the tip temperature of in-cylinder injector 110 and the $NO_x$ concentration are indicators of the deposit production.

Among these indicators, the embodiment focuses particularly on the carbon content. For example, when the revolution speed of engine 10 rapidly increases in the start operation, there are tendencies that the degree of lightness in the fuel properties is high (i.e., the fuel of the high degree of lightness is highly volatile so that the revolution speed of engine 10 rapidly increases in the starting operation), and that the fuel contains much olefin. Since the olefin is unsaturated hydrocarbon with at least one carbon-carbon double bond, it can be considered that the fuel containing more olefin may produce more deposits on the tip of in-cylinder injector 110.

According to the fuel injection control device of the internal combustion engine of the embodiment, the fuel is injected only from intake passage injector 120 when engine 10 is in a low water temperature region (i.e., cold) and thus the fuel injected from the injector is less vaporizable, or when engine 10 is in a low revolution speed region (particularly, idle region). This is for the following reason. When in-cylinder injector 110 injects the fuel when engine 10 is running in the low water temperature region or the low revolution speed region, the spray state deteriorates or slow combustion occurs. This tends to cause the worse combustion state as compared with the case where intake passage injector 120 injects the fuel, and results in a possibility that the fuel consumption as well as the exhaust gas properties deteriorate. Further, in the low speed (and low load) region, the operation sound of engine 10 is small so that the driver notices more remarkably the operation sound of high-pressure fuel pump 150 that supplied the fuel to in-cylinder injector 110. Therefore, High-pressure fuel pump 150 is controlled to stop its operation (i.e., to keep the electromagnetic spill valve open) for lowering the noises and vibrations.

As described above, in-cylinder injector 110 does not inject the fuel in the operation region in which the fuel injection only by intake passage injector 120 is preferable. Therefore, the production of deposits in nozzle 500 is likely to occur. Particularly, when the fuel is light in property, this causes rapid production of deposits. Therefore, according to the fuel injection control device of the internal combustion engine of the embodiment, the injectors are controlled to inject the fuel from in-cylinder injector 110 corresponding to the fuel properties when the operation is in the region where only intake passage injector 120 may inject the fuel.

Figure 4:
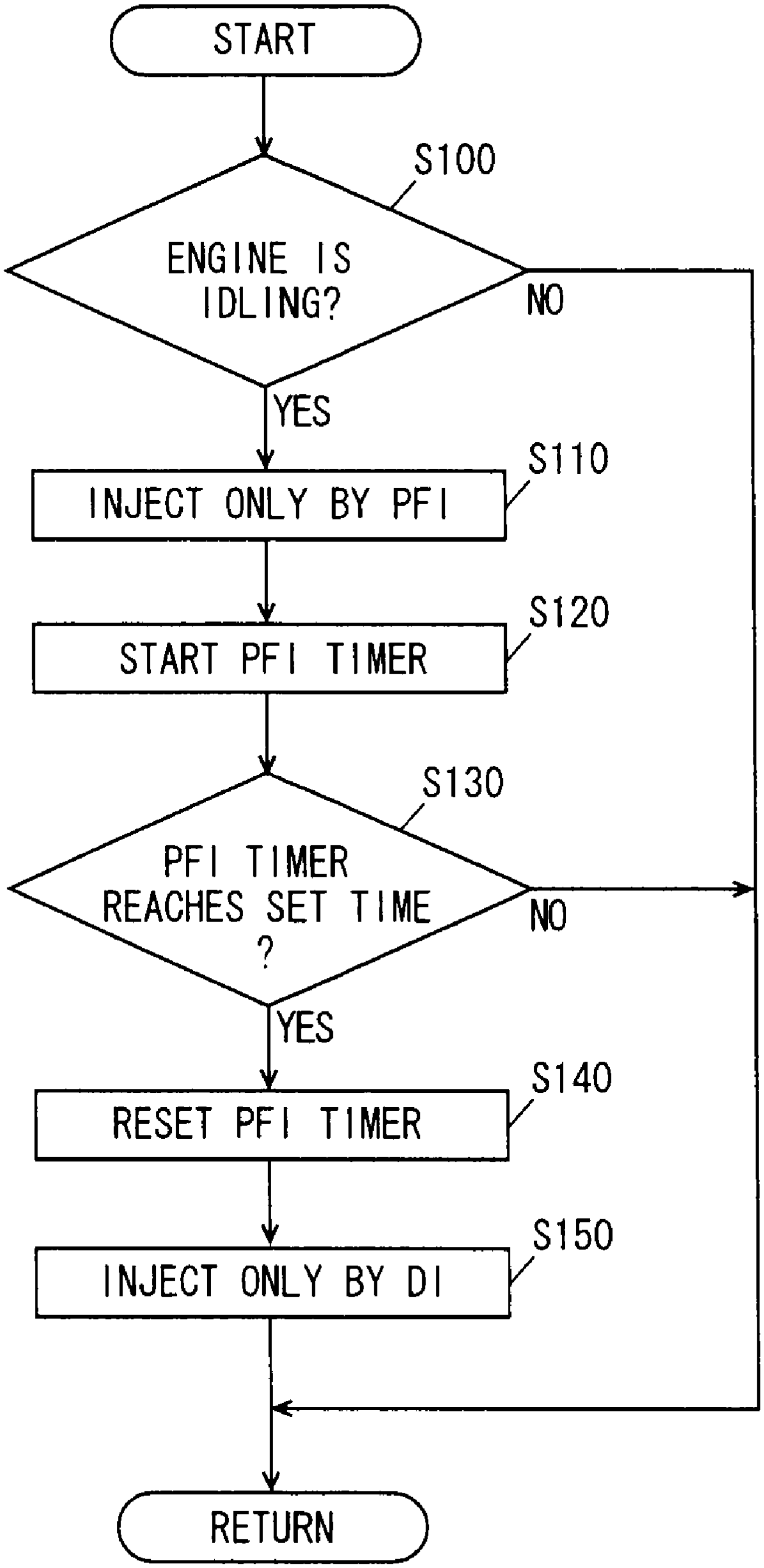
FIGS. 4 and 5 are flowcharts illustrating a control structure of a program executed by an engine ECU that is the control device according to the embodiment of the invention.

Referring to FIG. 4, description will be given on a control structure of a program executed by engine ECU 300 that is the fuel injection control device of the embodiment. Execution of this program is repeated in a cycle of a predetermined time.

In step (which will be abbreviated as "S" hereinafter) 100, engine ECU 300 determines whether engine 10 is idling or not. Engine ECU 300 performs this determination about the idling state based on the degree of press-down of the accelerator pedal represented by the signal supplied from accelerator press-down degree sensor 440. When engine 10 is idling (YES in S100), the process proceeds to S110. Otherwise (NO in S100), the process ends.

In S110, engine ECU 300 controls the fuel injection such that only intake passage injector 120 injects the fuel. In S300, engine ECU 300 starts a PFI timer. This PFI timer is an addition timer by which engine ECU 300 can sense arrival at a set time. The PFI timer may be a subtraction time by which engine ECU 300 can sense that a remaining time obtained by subtraction from a set time arrives at 0.

In S130, engine ECU 300 determines whether the PFI timer has arrived at the set time or not. This set time is based on the fuel properties. This will be described later in detail. When the PFI timer arrives at the set time (YES in S130), the process proceeds to step S140. Otherwise (NO in S130), the process ends.

In S140, engine ECU 300 resets the PFI timer. In S150, engine ECU 300 controls the fuel injection to inject the fuel only from in-cylinder injector 110. Thereafter, the process ends.

Description will now be given on the operation of the engine controlled based on the foregoing structures and flowchart by engine ECU 300 that is the fuel injection control device of the embodiment.

When engine 10 is idling (YES in S100), only intake passage injector 120 injects the fuel in view of measures for improving combustion, measures against exhaust smoke, measures against noises and vibrations, and the like (S110). The PFI timer starts to measure the time for which only intake passage injector 120 injects the fuel (S120). A set time is already set, and deposits may be produced on in-cylinder injector 110 after elapsing of this set time. When the measured time reaches this set time (YES in S130), the fuel injection only by in-cylinder injector 110 starts (S150). In this operation, the engine is idling and the total fuel injection quantity (a sum of the fuel injection quantity of in-cylinder injector 110 and that of intake passage injector 120) is equal to the quantity of the fuel injected by in-cylinder injector 110 so that such a state is kept that the fuel injection quantity of in-cylinder injector 110 does not become smaller than the minimum fuel injection quantity of in-cylinder injector 110 (i.e., the minimum fuel quantity establishing linearity between the fuel injection time and the fuel injection quantity). Therefore, the predetermined quantity of fuel can be injected only from in-cylinder injector 110.

Figure 6:
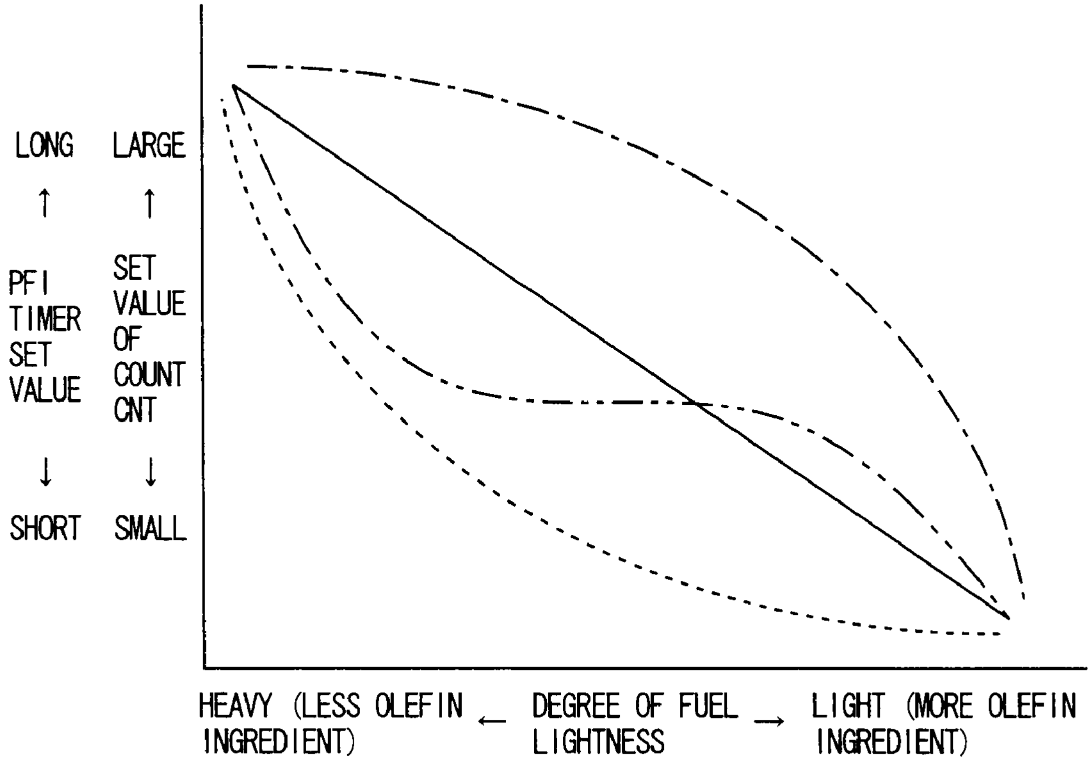
FIG. 6 is a map stored in the engine ECU that is the control device according to the embodiment of the invention.

The set time in the PFI timer is determined using, as an indicator, the possibility of the deposit production on in-cylinder injector 110 and using the fuel properties shown in FIG. 6 as parameters. As shown in FIG. 6, as the fuel is lighter in property (i.e., as the olefin ingredient increases), the PFI timer set value is set smaller. The PFI timer set value using the fuel properties as parameter has been described by way of example, and the invention is not restricted to the example (solid line, dotted line, alternate long and short dash line, and alternate long and two short dashes line) shown in FIG. 6.

As described above, when the engine is idling, the time for which only the intake passage injector injects the fuel is set shorter as the fuel is lighter in property, and the in-cylinder injector also injects the fuel. Therefore, the two types of injectors are controlled such that the fuel injection can be changed from that only by the intake passage injector to that only by the in-cylinder injector at an earlier time as the fuel ingredients are lighter and contain a larger amount of olefin ingredient and thus the deposits are more likely to be produced. Thereby, it is possible to prevent appropriately the production of the deposits in the nozzle of the in-cylinder injector.

<Modification>

Figure 5:
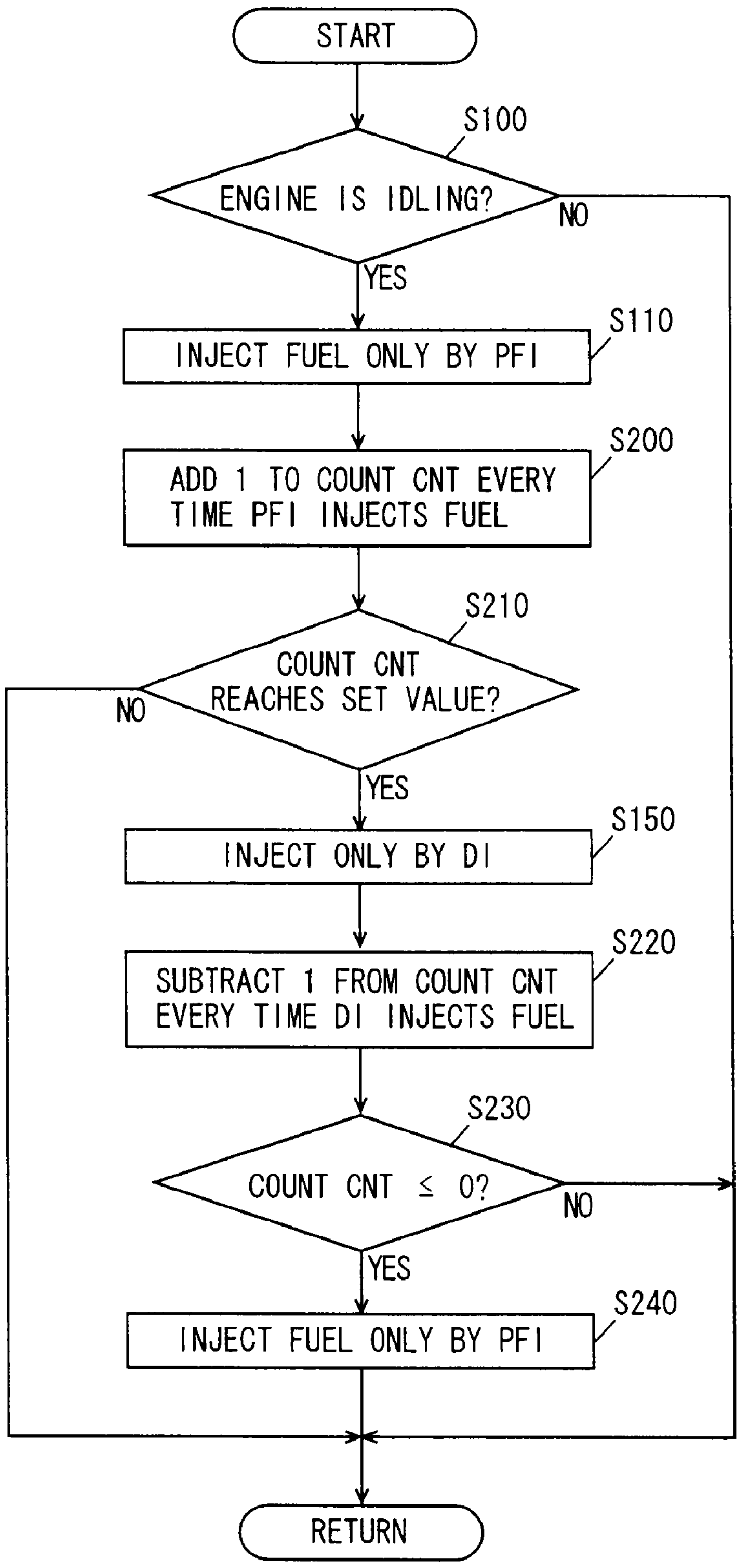

A modification of the fuel injection control device according to the embodiment will be described below. FIG. 5 illustrates a control structure of a program executed by engine ECU 300 that is the fuel injection control device according to the modification. Execution of this program is repeated in a cycle of a predetermined time. Details other than those in this flowchart are the same as those of the foregoing embodiment. Therefore, description thereof is not repeated.

The flowchart in FIG. 5 is different from that in FIG. 4 in that (1) the number of times of fuel injection by intake passage injector 120 is counted instead of measuring the time length of the fuel injection by intake passage injector 120, and that (2) only intake passage injector 120 injects the fuel, then only in-cylinder injector 110 injects the fuel when the count conditions are satisfied, and further the fuel injection only by intake passage injector 120 will resume when resumption conditions are satisfied.

In the flowchart of FIG. 5, the same steps as those in the flowchart of FIG. 4 bear the same step numbers, and details thereof are the same those in FIG. 4. Therefore, description thereof will not be repeated.

In S200, engine ECU 300 adds one to a count CNT in response to every fuel injection by intake passage injector 120.

In S210, engine ECU 300 determines whether count CNT reaches a set value or not. This set value is determined based on the fuel properties, as will be described later in detail. When count CNT reaches the set value (YES in S210), the process proceeds to step S150. Otherwise (NO in S210), the process ends.

In S220, engine ECU 300 subtracts one form count CNT in response to every fuel injection by in-cylinder injector 110.

In S230, engine ECU 300 determines whether count CNT has arrived at 0 or less, or not. When count CNT reaches 0 or less (YES in S230), the process proceeds to S240. Otherwise (NO in S230), the process ends.

In S240, engine ECU 300 executes the fuel injection control to inject the fuel only from intake passage injector 120. Thereby, the fuel injection during the idle state of engine 10 is switched from the fuel injection only by in-cylinder injector 110 that has been executed for avoiding the production of deposits in the nozzle of in-cylinder injector 110 to the fuel injection only by intake passage injector 120, i.e., the fuel injection that is appropriate in view of the measures for improving combustion, measures against exhaust smoke, measures against noises and vibrations, and the like.

Description will now be given on the operation of the engine controlled based on the foregoing structures and flowchart by engine ECU 300 that is the fuel injection control device according to the modification.

When engine 10 is idling (YES in S100), only intake passage injector 120 injects the fuel in view of the measures for improving combustion, measures against exhaust smoke, measures against noises and vibrations, and the like (S110). One is added to count CNT (S200) every time intake passage injector 120 injects the fuel. A set time is already set, and deposits may be produced on in-cylinder injector 110 after elapsing of this set time. When count CNT reaches the set value (YES in S210), the fuel injection only by in-cylinder injector 110 starts (S150). In this operation, the fuel of the quantity exceeding the minimum fuel quantity of in-cylinder injector 110 can be injected only from in-cylinder injector 110, as already described.

The set value of count CNT is set using, as an indicator, the possibility of the deposit production on in-cylinder injector 110 and using the fuel properties shown in FIG. 6 as parameters. As shown in FIG. 6, as the fuel is lighter in property (i.e., as the olefin ingredient increases), the set value of count CNT is set smaller. The set value of count CNT using the fuel properties as parameter has been described by way of example, and the invention is not restricted to the example shown in FIG. 6.

Count CNT is decremented by one in response to every fuel injection by in-cylinder injector 110 (S220). When only in-cylinder injector 110 injects the fuel corresponding to the number of times of the fuel injection only by intake passage injector 120, the fuel injection is switched to the original injection, i.e., the injection only by intake passage injector 120. Thus, one is added to count CNT in response to every fuel injection by intake passage injector 120, and one is subtracted from count CNT in response to every fuel injection by in-cylinder injector 110. When count CNT reaches 0 or less, the fuel injection only by intake passage injector 120 resumes.

As described above, when the engine is idling, the number of times that only the intake passage injector injects the fuel is set smaller as the fuel is lighter in property, and the in-cylinder injector also injects the fuel. Therefore, the two types of injectors are controlled such that the fuel injection can be changed from that only by the intake passage injector to that only by the in-cylinder injector at an earlier time as the fuel ingredients are lighter and contain a larger amount of olefin ingredient and thus the deposits are more likely to be formed. Thereby, it is possible to prevent appropriately the production of the deposits in the nozzle of the in-cylinder injector. Further, the fuel injection only by intake passage injector 120 resumes after the fuel is injected only by in-cylinder injector 110 corresponding to the number of times of the fuel injection only by intake passage injector 120. Thereby, it is possible to resume the fuel injection only by intake passage injector that is appropriate in view of the measures for improving combustion, measures against exhaust smoke, measures against noises and vibrations, and the like. Therefore, the deposit production can be avoided while taking the measures for improving combustion, measures against exhaust smoke, measures against noises and vibrations, and the like.

Engine Suitable for Employing the Control Device (Example 1)

An engine (example 1) that is suitable for employing the control device according to the embodiment will be described below.

Figure 7:
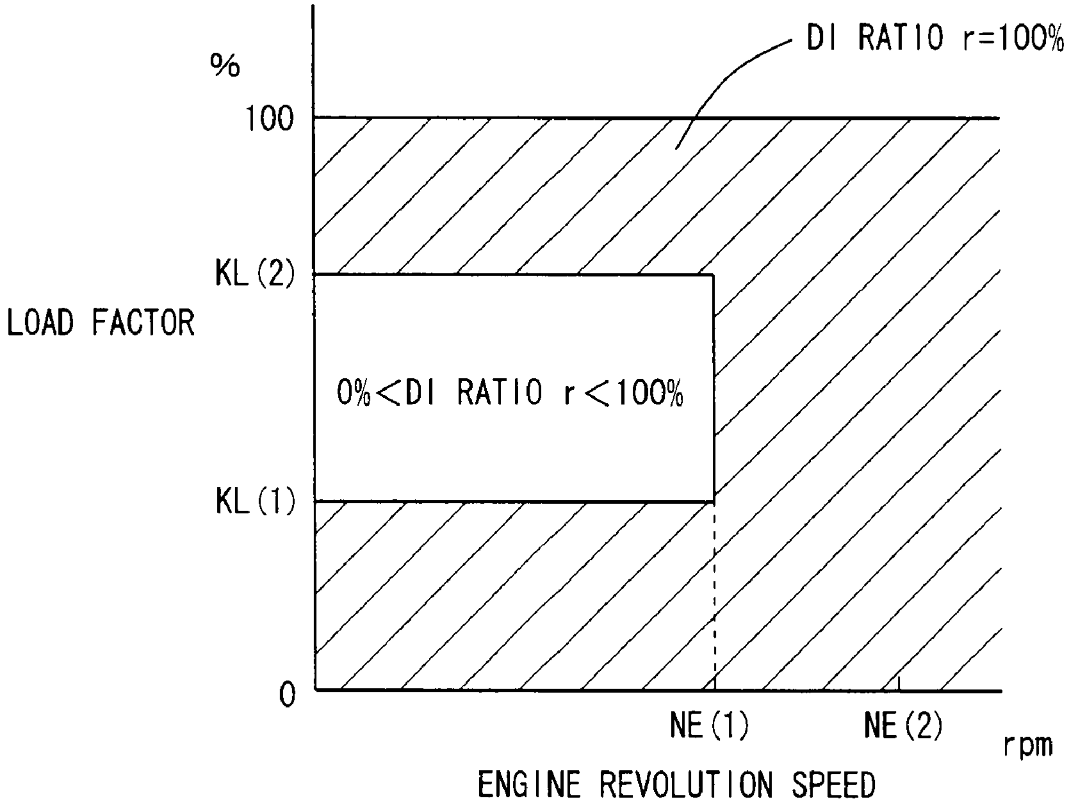
FIGS. 7 and 9 show DI ratio maps of a warm engine that can appropriately employ the control device according to the embodiment of the invention.
Figure 8:
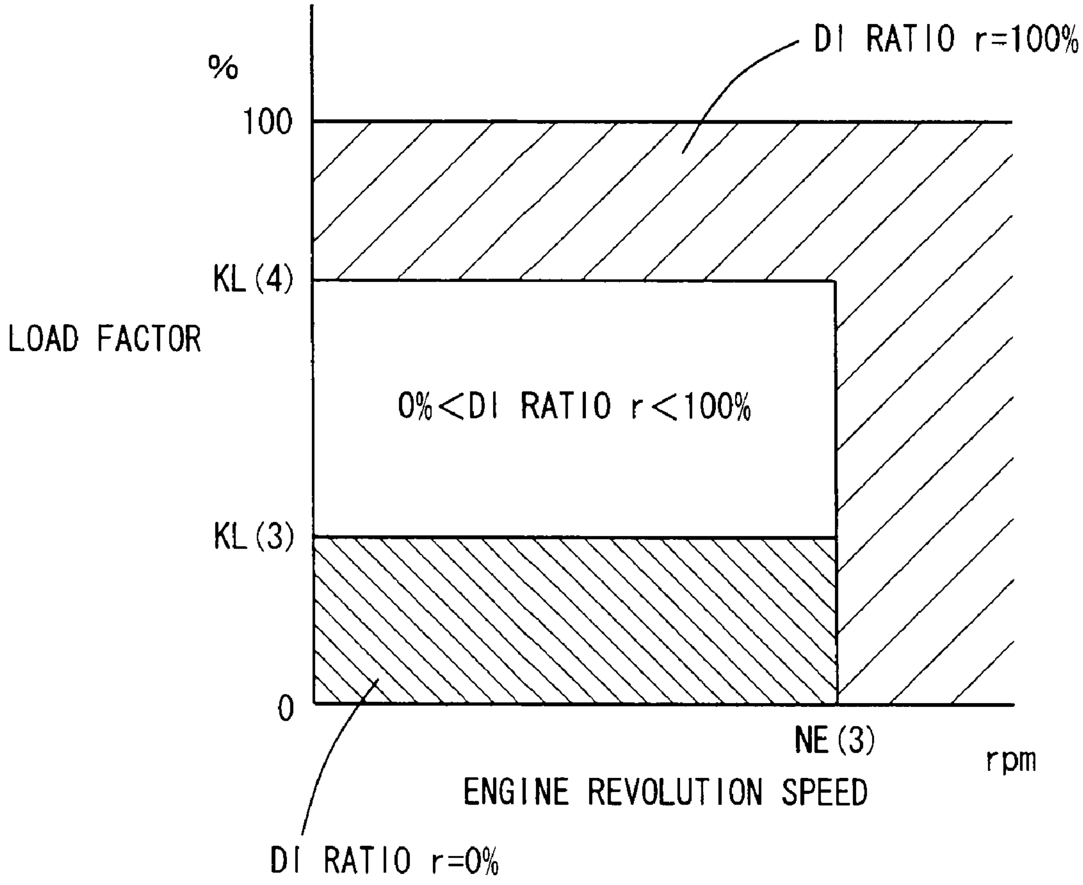
FIGS. 8 and 10 show the DI ratio maps of the cold engine that can appropriately employ the control device according to the embodiment of the invention.

Referring to FIGS. 7 and 8, description will be given on maps representing information corresponding to the drive state of engine 10, and more specifically representing an injection ratio (which will also be referred to as a “DI ratio (r)” hereinafter) between in-cylinder injector 110 and intake passage injector 120. ROM 320 of engine ECU 300 has store these maps. FIG. 7 is a map for a hot state of engine 10, and FIG. 8 is a map for a cold state of engine 10.

As shown in FIGS. 7 and 8, the abscissa in each map gives the revolution speed of engine 10, the ordinate gives a load factor and a sharing ratio of in-cylinder injector 110 is represented as DI ratio r in percentage.

As shown in FIGS. 7 and 8, DI ratio r is set for each of drive regions defined by the revolution speed and load factor of engine 10. "DI ratio r=100%" means that only in-cylinder injector 110 performs the fuel injection in this region, and "DI ratio r=0%" means that only intake passage injector 120 performs the fuel injection in this region. "DI ratio r≈0%", "DI ratio r≈100%" and "0%<DI ratio r<100%" mean that in-cylinder injector 110 and intake passage injector 120 share the fuel injection in these regions. Roughly speaking, in-cylinder injector 110 contributes to the rising of the output performance, and intake passage injector 120 contributes to the homogenizing of the air-fuel mixture. The two types of injectors that have the different characteristics as described above, respectively, are appropriately used depending on the revolution speed and load factor of engine 10, and thereby engine 10 performs only the homogenous combustion in the normal drive state (i.e., in the states other than unusual drive states such as a state where catalyst is being warmed during idling).

Further, as shown in FIGS. 7 and 8, DI sharing ratio r between in-cylinder injector 110 and intake passage injector 120 is defined in each of the map for warm driving and that for cold driving. When the temperature of engine 10 changes, the control regions of in-cylinder injector 110 and intake passage injector 120 change in these maps, which are used as follows. The temperature of engine 10 is sensed, and the map of FIG. 7 for warm driving is selected when the temperature of engine 10 is equal to or higher than a predetermined temperature threshold. Otherwise, the map of FIG. 8 for cold driving is selected. Based on the map thus selected, in-cylinder injector 110 and/or intake passage injector 120 are controlled according to the revolution speed and load factor of engine 10.

Description will be given on the revolution speed and load factor of engine 10 that are set in FIGS. 7 and 8. In FIG. 7, NE(1) is set between 2500 rpm and 2700 rpm, KL(1) is set between 30% and 50%, and KL(2) is set between 60% and 90%. In FIG. 8, NE(3) is set between 2900 rpm and 3100 rpm. Thus, NE(1) is smaller than NE(3). NE(2) in FIG. 7 as well as KL(3) and KL(4) in FIG. 8 are appropriately set.

Referring to FIGS. 7 and 8, NE(3) in the cold-drive map of FIG. 8 is higher than NE(1) in the warm-drive map of FIG. 7. This means that the control region of intake passage injector 120 expands to a region of a higher engine revolution speed as the temperature of engine 10 lowers. Since engine 10 is cold, the deposits are hardly produced in the nozzle of in-cylinder injector 110 (even when in-cylinder injector 110 does not inject the fuel). Therefore, the map is set to expand the region where the fuel is injected by intake passage injector 120, and the homogeneity can be improved.

Referring to FIGS. 7 and 8, "DI ratio r=100%" is established in the region of the warm-drive map where the revolution speed of engine 10 is equal to or higher than NE(1), and is also established in the region of the cold-drive map where the revolution speed is equal to or higher than NE(3). Further, "DI ratio r=100%" is established in the region of the warm-drive map where the load factor is equal to or higher than KL(2), and is also established in the region of the cold-drive map where the load factor is equal to or higher than KL(4). This indicates that only in-cylinder injector 110 is used in a predetermined high engine revolution speed region, and only in-cylinder injector 110 is used in a predetermined high engine load region. Thus, in the high revolution speed region and the high load region, even when only in-cylinder injector 110 injects the fuel, the air-fuel mixture can be easily homogenized only by in-cylinder injector 110 because the revolution speed and load of engine 10 are high and the quantity of intake air is large. In the above operation, the fuel injected from in-cylinder injector 110 obtains vaporization latent heat in the combustion chamber to vaporize. Thereby, the temperature of the air-fuel mixture at a compression end lowers. Thereby, antiknocking performance is improved. Further, the temperature of the combustion chamber lowers so that the intake efficiency is improved and a high output can be expected.

In the warm-drive map shown in FIG. 7, only in-cylinder injector 110 is used when the load factor is equal to or lower than KL(1). This indicates that only in-cylinder injector 110 is used when engine 10 is high temperature and is operating in a predetermined low-load region. This is for the following reason. Deposits are easily produced in the nozzle of in-cylinder injector 110 because engine 10 is warm during the warm driving. However, the fuel injection by in-cylinder injector 110 can lower the temperature of the nozzle so that it may be expected that the deposit production may be avoided, and it may also be expected that in-cylinder injector 110 can ensure the minimum fuel injection quantity and thus can prevent the clogging thereof. Accordingly, the foregoing region is determined as the region using in-cylinder injector 110.

As is apparent from a comparison between FIGS. 7 and 8, the region of "DI ratio r=0%" is present only in the cold-drive map of FIG. 8. This indicates that only intake passage injector 120 is used in the predetermined low-load region (equal to or lower than KL(3)) when the temperature of engine 10 is low. This is for the following reason. The fuel vaporization is relatively suppressed because engine 10 is cold, and the load and the quantity of intake air of engine 10 are low. In this region, the fuel injection by in-cylinder injector 110 can hardly cause good combustion. Also, in the region of the low load and low revolution speed, high power production by in-cylinder injector 110 is not required so that in-cylinder injector 110 is not used, and only intake passage injector 120 is used.

When engine 10 is in the drive state other than the normal drive state (i.e., in the unusual drive state) and the catalyst is being warmed during idling, in-cylinder injector 110 is controlled to perform stratified combustion. The stratified combustion during the catalyst warming operation promotes the catalyst warming, and improves the emissions.

Engine Suitable for Employing the Control Device (Example 2)

An engine (example 2) that is suitable for employing the control device according to the embodiment will be described below. In the following description about the engine (example 2), description of the same details as those of the engine (example 1) will not be repeated.

Figure 9:
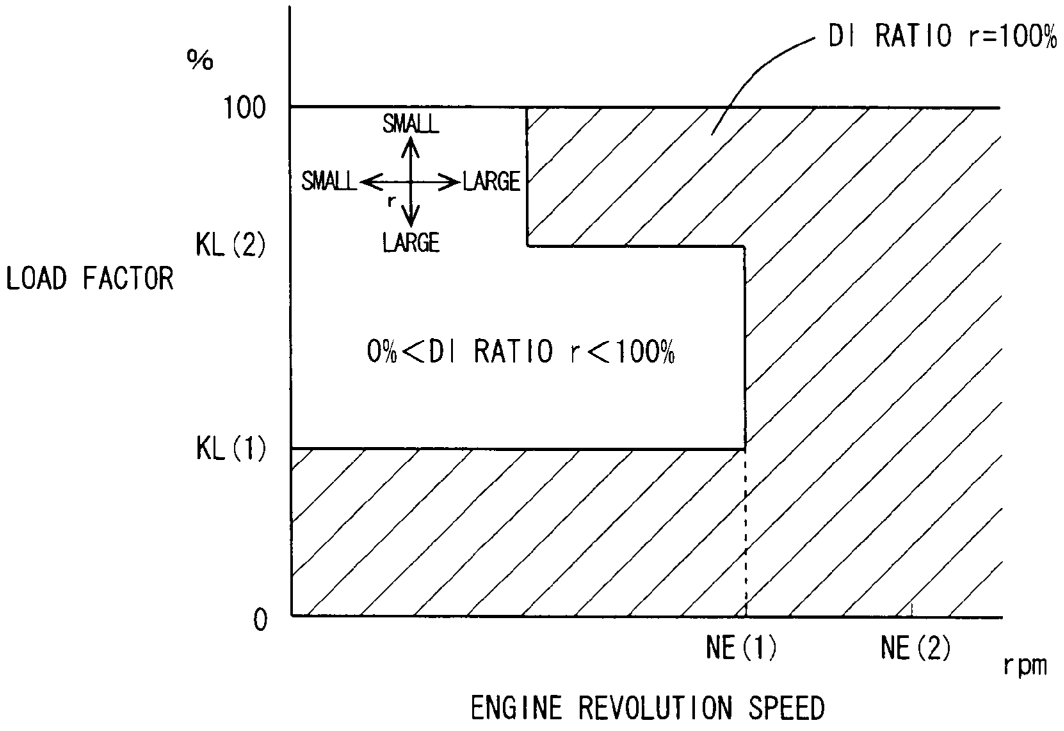
Figure 10:
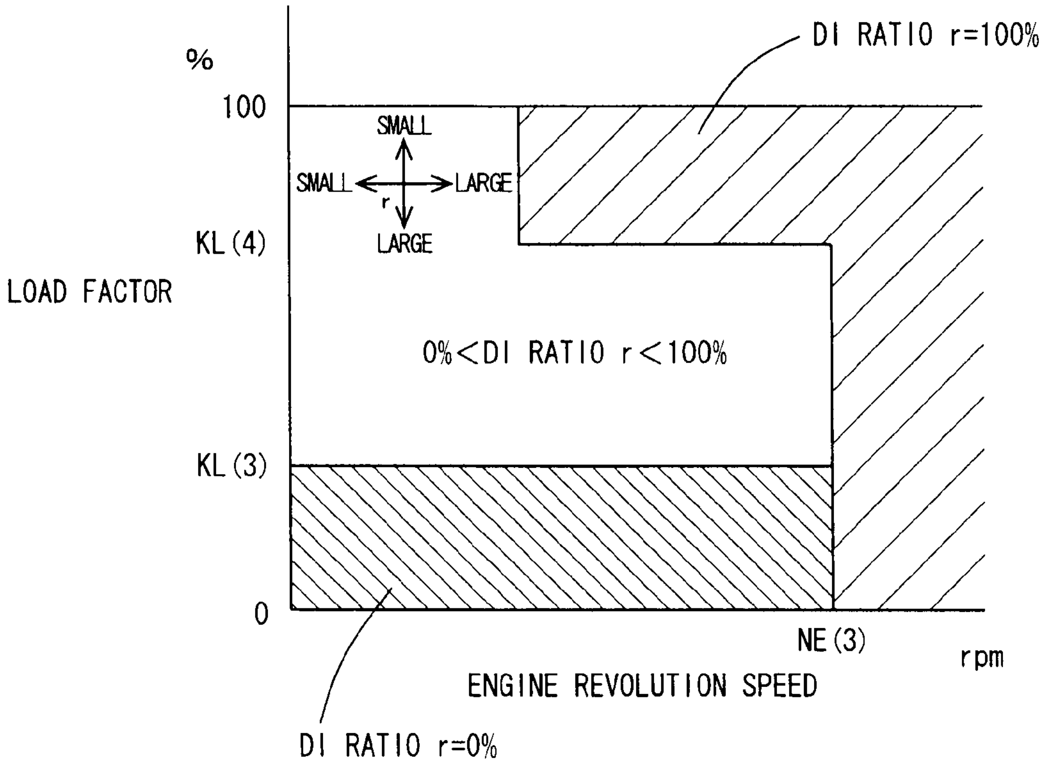

Referring to FIGS. 9 and 10, description will be given on maps representing information corresponding to the drive state of engine 10, and more specifically representing the injection ratio between in-cylinder injector 110 and intake passage injector 120. ROM 320 of engine ECU 300 has stored these maps. FIG. 9 is a map for the hot state of engine 10, and FIG. 10 is a map for the cold state of engine 10.

FIGS. 9 and 10 are different from FIGS. 7 and 8 in the following points. "DI ratio r=0%" is satisfied in a region of the warm-drive map where the revolution speed of engine 10 is equal to or higher than NE(1), and in a region of the cold-drive map where the revolution speed of engine 10 is equal to or higher than NE(3). Further, "DI ratio r=100%" is satisfied in a region of the warm-drive map where the load factor is equal to or higher than KL(2) but the low revolution speed region is not included, and in a region of the cold-drive map where the load factor is equal to or higher than KL(4) but the low revolution speed region is not included. This indicates that only in-cylinder injector 110 is used in a predetermined high engine revolution speed region, and only in-cylinder injector 110 is used in a large region within the predetermined high engine load region. However, in the region of the low revolution speed and high load, the fuel injected from in-cylinder injector 110 does not form a sufficiently mixed air-fuel mixture, and an inhomogeneous air-fuel mixture in the combustion chamber tends to cause unstable combustion. For preventing this problem, the injection ratio of the in-cylinder injector increases as the operation moves toward the high revolution speed region where the above problem does not occur. Further, the injection ratio of the in-cylinder injector decreases as the operation moves toward the high load region where the above problem may occur. Crossing arrows in FIGS. 9 and 10 indicate the changes in DI ratio r. The above control can suppress the variations in output torque of the engine due to the unstable combustion. It is noted for confirmation that the above manner of control is substantially equivalent to such control that the injection ratio of in-cylinder injector 110 decreases as the operation changes toward the predetermined low revolution speed region, and that the injection ratio of in-cylinder injector 110 increases as the operation moves toward the low load region. In a region other than the above region represented by the crossing arrows in FIGS. 9 and 10, and particularly in the region (on the high revolution speed side and low load side) where only in-cylinder injector 110 injects the fuel, the air-fuel mixture can be homogenized easily only by in-cylinder injector 110. In the above operation, the fuel injected from in-cylinder injector 110 obtains vaporization latent heat in the combustion chamber to vaporize. Thereby, the temperature of the air-fuel mixture at a compression end lowers. Thereby, antiknocking performance is improved. Further, the temperature of the combustion chamber lowers so that the intake efficiency is improved and a high output can be expected.

In engine 10 that has been described with reference to FIGS. 7 to 10, the homogenous combustion can be implemented by setting the fuel injection timing of in-cylinder injector 110 to inject the fuel in the intake stroke, and the stratified combustion can be implemented by setting the fuel injection timing of in-cylinder injector 110 to inject the fuel in the compression stroke. Thus, by setting the fuel injection timing of in-cylinder injector 110 to inject the fuel in the compression stroke, a rich air-fuel mixture is formed primarily around an ignition plug so that the stratified combustion can be implemented by igniting a lean air-fuel mixture when viewed as a whole combustion chamber. Further, even when the fuel injection timing of in-cylinder injector 110 is set to performed the fuel inject in the intake stroke, it may be possible to form a rich air-fuel mixture primarily around the ignition plug, in which case the stratified combustion can be implemented even by the intake stroke injection.

The stratified combustion in this description includes stratified combustion as well as weakly stratified combustion described below. According to the weakly stratified combustion, intake passage injector 120 performs the fuel injection in the intake stroke to produce a lean and homogenous air-fuel mixture in the whole combustion chamber, and further in-cylinder injector 110 performs the fuel injection in the compression stroke to produce a rich air-fuel mixture around the ignition plug so that the combustion state may be improved. This weakly stratified combustion is preferably performed during the catalyst warming for the following reason. In the catalyst warming operation, the ignition timing must be significantly retarded for bringing the hot combustion gas into contact with the catalyst, and further a good combustion state (idle state) must be maintained. Also, a certain amount of fuel must be supplied. When the stratified combustion is performed for meeting the above requirements, this results in a problem that the fuel quantity is small. When the homogenous combustion is performed for meeting the above requirements, this results in a problem that the amount of retardation for maintaining good combustion is smaller than that in the stratified combustion. In view of the above, it is preferable to use the foregoing weakly stratified combustion in the catalyst warming operation, but either of the stratified combustion and weakly stratified combustion can be employed.

In the engine already described with reference to FIGS. 7 to 10, it is preferable that the fuel injection of in-cylinder injector 110 is performed in the compression stroke, for the following reason. However, when engine 10 already described operates in a major and thus basic region (i.e., a region except for the region of the weakly stratified combustion that is performed only for the catalyst warming, and is configured to perform the intake stroke injection by intake passage injector 120 and to perform the compression stroke injection by in-cylinder injector 110), in-cylinder injector 110 performs the fuel injection in the intake stroke. For the following reason, however, in-cylinder injector 110 may be configured to perform temporarily the fuel injection in the compression stroke for the purpose of stabilizing the combustion.

When in-cylinder injector 110 performs the fuel injection in the compression stroke, the fuel injection cools the air-fuel mixture during a period for which a temperature in the cylinder is significantly high. Since the cooling effect is high, the antiknocking performance can be improved. Further, when in-cylinder injector 110 performs the fuel injection in the compression stroke, a time from the fuel injection to the ignition becomes short so that the fuel jet can enhance the mixture flow, and the combustion speed can be increased. Owing to these improvement in antiknocking performance and the increase in combustion speed, it is possible to avoid the combustion variations and to improve the combustion stability.

Further, the control may be configured to use the warm-drive maps shown in FIGS. 7 and 9 independently of the temperature of engine 10 (i.e., in both the warm and cold states) during off-idle operations (i.e., when an idle switch is off, or when accelerator pedal is being depressed). Thus, the control may be configured to use in-cylinder injector 110 in the low load region independently of the cold and warm states.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A fuel injection control device of an internal combustion engine provided with a first fuel injection mechanism injecting fuel into a cylinder and a second fuel injection mechanism injecting the fuel into an intake passage, comprising:

a control unit configured to control the first and second fuel injection mechanisms to share the fuel injection between the first and second fuel injection mechanisms, such that only the second fuel injection mechanism provides the fuel injection if a predetermined condition is met; and a setting unit configured to set a period of time for the fuel injection provided only by said second fuel injection mechanism based on an ingredient of the fuel that relates to a degree of production of in-cylinder deposits in said first fuel injection mechanism; wherein the setting unit sets the period smaller as a quantity of the ingredient of the fuel increases, and when the period expires the control unit controls the first and second fuel injection mechanisms such that only the first fuel injection mechanism provides the fuel injection.

2. The fuel injection control device of the internal combustion engine according to claim 1, wherein said control unit controls the first and second fuel injection mechanisms when said internal combustion engine is idling.

3. The fuel injection control device of the internal combustion engine according to claim 1, wherein said control unit controls the first and second fuel injection mechanisms according to the state of the fuel injection only by said second fuel injection mechanism such that the fuel injection returns from the fuel injection by said first fuel injection mechanism to the fuel injection only by said second fuel injection mechanism.

4. The fuel injection control device of the internal combustion engine according to claim 3, wherein said control unit controls the first and second fuel injection mechanisms when said internal combustion engine is idling.

5. The fuel injection control device of the internal combustion engine according to claim 1, wherein said ingredient of the fuel relates to a content of olefin.

6. The fuel injection control device of the internal combustion engine according to claim 2, wherein said ingredient of the fuel relates to a content of olefin.

7. The fuel injection control device of the internal combustion engine according to claim 3, wherein said ingredient of the fuel relates to a content of olefin.

8. The fuel injection control device of the internal combustion engine according to claim 4, wherein said ingredient of the fuel relates to a content of olefin.

9. The fuel injection control device of the internal combustion engine according to claim 1, wherein the predetermined condition is met if the internal combustion engine is in a relatively low water temperature region.

10. The fuel injection control device of the internal combustion engine according to claim 1, wherein the predetermined condition is met if the internal combustion engine is in a relatively low revolution speed region.

11. The fuel injection control device of the internal combustion engine according to claim 2, wherein the predetermined condition is met if the internal combustion engine is idling.

12. The fuel injection control device of the internal combustion engine according to claim 2, further comprising:

an accelerator sensor which detects a degree to which an accelerator is pressed, and wherein the control unit determines that the internal combustion engine is idling based on the degree to which the accelerator is pressed.

* * * * *